United States Patent
Aytur et al.

(10) Patent No.: US 7,986,739 B2
(45) Date of Patent: Jul. 26, 2011

(54) DETECT-AND-AVOID METHOD AND ARCHITECTURE FOR ULTRA-WIDEBAND SYSTEM

(75) Inventors: Turgut Aytur, Plattsburgh, NY (US); Stephan ten Brink, Irvine, CA (US); Ravishankar H. Mahadevappa, Irvine, CA (US); Venkatesh Rajendran, Irvine, CA (US)

(73) Assignee: Realtek Semiconductor Corp., Hsinchu (TW)

( * ) Notice: Subject to any disclaimer, the term of this patent is extended or adjusted under 35 U.S.C. 154(b) by 674 days.

(21) Appl. No.: 12/036,968

(22) Filed: Feb. 25, 2008

(65) Prior Publication Data

US 2008/0207156 A1 Aug. 28, 2008

Related U.S. Application Data

(60) Provisional application No. 60/891,440, filed on Feb. 23, 2007.

(51) Int. Cl.
H04L 27/28 (2006.01)

(52) U.S. Cl. ........ 375/260; 375/130; 375/132; 375/135; 375/136; 375/142; 375/144; 375/146; 375/147; 375/148; 375/150; 375/219; 375/316; 375/340; 375/343; 375/346; 455/296; 455/307; 455/501; 370/335; 370/342

(58) Field of Classification Search .................. 375/130, 375/132, 135, 136, 142, 144, 146, 147, 148, 375/150, 219, 260, 316, 340, 343, 346
See application file for complete search history.

(56) References Cited

U.S. PATENT DOCUMENTS

| | | | |
|---|---|---|---|
| 7,177,614 B2 | 2/2007 | Agarwal et al. | |
| 7,773,663 B2* | 8/2010 | Watanabe | 375/150 |
| 2006/0171445 A1* | 8/2006 | Batra et al. | 375/130 |

FOREIGN PATENT DOCUMENTS

WO    WO 00/46929 A1    8/2000

OTHER PUBLICATIONS

Written Opinion of the International Searching Authority for International Application No. PCT/US2008/054914, filed Feb. 25, 2008, Written Opinion dated Jul. 2, 2008 and mailed Jul. 2, 2008 (6 pgs.).
International Search Report for International Application No. PCT/US2008/054914, filed Feb. 25, 2008, International Search Report dated Jul. 2, 2008 and mailed Jul. 2, 2008 (3 pgs.).

* cited by examiner

*Primary Examiner* — Leon Flores
(74) *Attorney, Agent, or Firm* — Thomas, Kayden, Horstemeyer & Risley, LLP

(57) ABSTRACT

A method and system for detecting the presence of narrowband transmitters utilizing frequencies also utilized by wider band communication systems. In some embodiments an ultrawideband transceiver detects signals at specific frequencies within a spectrum of frequencies, and analyzes the signals to determine if the signals indicate transmissions by a narrowband transmitter in a narrowband communication system. In further embodiments transmission circuitry reduces signal components at frequencies occupied by the narrowband transmitters.

13 Claims, 8 Drawing Sheets

DETECT-AND-AVOID METHOD AND ARCHITECTURE FOR ULTRA-WIDEBAND SYSTEM

CROSS-REFERENCE TO RELATED APPLICATION(S)

This application claims the benefit of the filing date of U.S. Provisional Patent Application No. 60/891,440, filed Feb. 23, 2007, the disclosure of which is incorporated by reference herein.

BACKGROUND OF THE INVENTION

The present invention relates generally to wideband and ultrawideband wireless communication systems, and more particularly to detection and avoidance of narrowband interferers by an ultrawideband wireless communication system.

Ultrawideband wireless communication systems generally transmit information over a band of frequencies, for example using orthogonal frequency division multiplexing (OFDM). In addition, such communication systems may operate while also periodically hopping between several frequency bands. Communication over a band of frequencies, and also hopping between different frequency bands, may be beneficial in limiting errors due to communication medium effects, such as due to interference, multi-path signals or other factors. In addition, such communication may allow for decreased transmit output power and for decreased interference with narrowband transmissions within the band of frequencies.

However, communication over a wide range of frequencies may still potentially interfere with some narrowband transmissions of others. In addition, some jurisdictions may require that ultrawideband wireless communication systems not engage in transmissions that may interfere with transmission of narrowband transmission systems that have been allocated transmission rights with respect to defined portions of the spectrum.

Avoiding potential interference with narrowband transmitters may impose difficulties. Avoidance of transmission over portions of the spectrum may unduly limit communication bandwidth, and determining if a narrowband transmitter is present may be difficult.

SUMMARY OF THE INVENTION

The invention provides for detection, and in some embodiments avoidance, of narrowband transmitters. In one aspect the invention provides a method of detecting communications by narrowband communications systems for avoidance of interference with the narrowband communication systems, comprising determining if a received signal about a selected frequency has characteristics of a signal expected to be communicated by a narrowband transmission system; and reducing transmissions about the selected frequency if the received signal about the selected frequency has characteristics of the signal expected to be communicated by the narrowband transmission system. In another aspect the invention provides a transceiver for an ultrawideband communication system, comprising downconversion circuitry for downcoverting a received signal to baseband; an analog to digital converter for converting the baseband signal to a digital signal; a Fast Fourier Transform block for transforming the digital signal to a frequency domain signal; receiver processing circuitry for processing the frequency domain signal to provide a data stream; a filter for filtering the digital signal outside a band of frequencies; a correlator for comparing the band filtered signal to a pattern characteristic of a signal in a narrowband communication system; an inverse Fast Fourier Transform block for transforming a signal for transmission to a time domain signal; a digital to analog converter for converting the time domain signal to an analog signal; upconversion circuitry for upconverting the analog signal to radio frequency; and circuitry for reducing signal components at frequencies identified as in use by the narrowband communication system.

These and other aspects of the invention will be more fully appreciated by persons skilled in the art upon review of this disclosure

DETAILED DESCRIPTION

Figure 1:
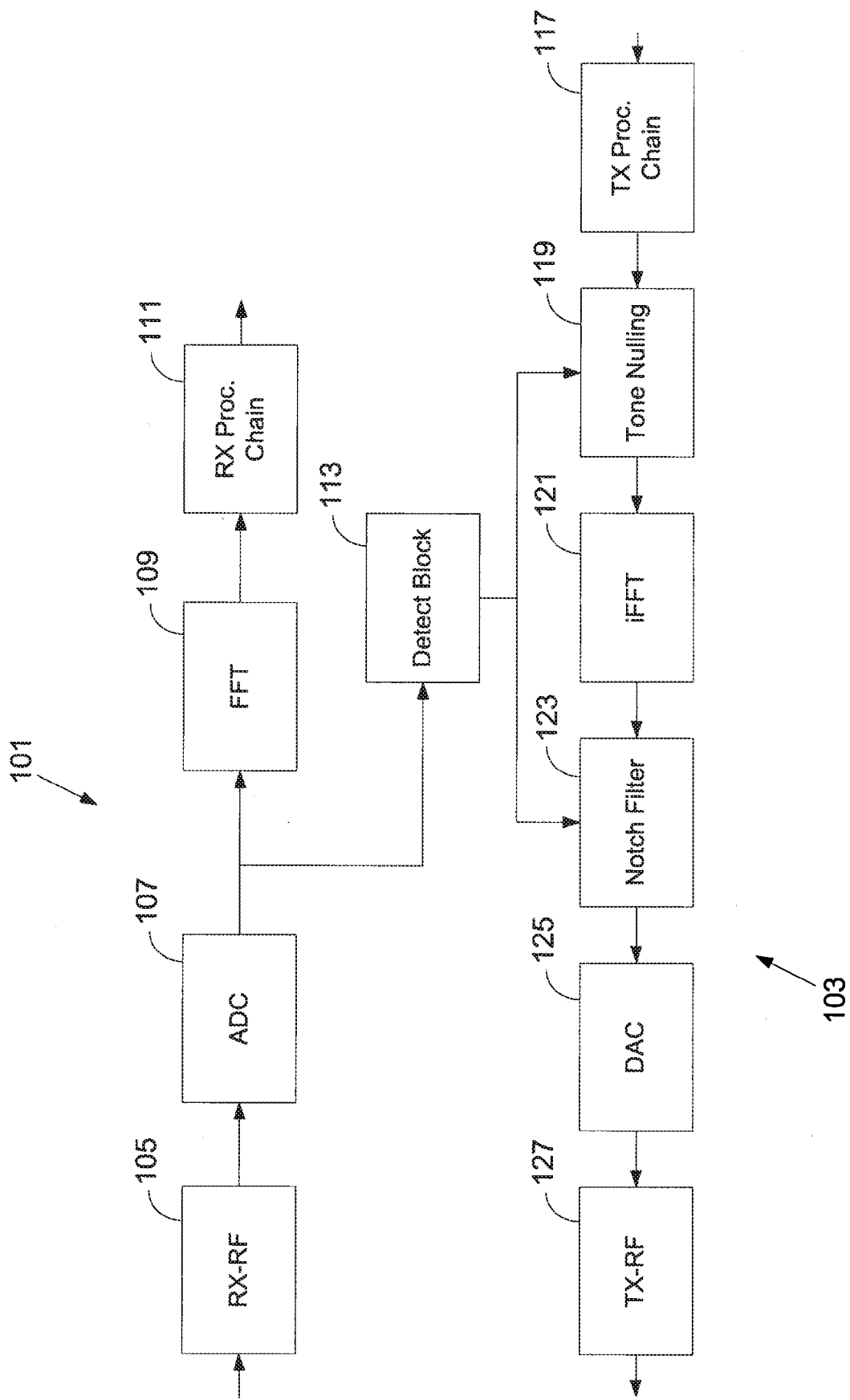
FIG. 1 is a block diagram of a transceiver in accordance with aspects of the invention.

FIG. 1 is a block diagram of a system in accordance with aspects of the invention. The system includes a receive chain 101 and a transmit chain 103. In the receive chain, a receiver (RX) RF block 105 receives a signal from an antenna (not shown). The RX-RF block processes received radio frequency signals and downconverts the received signals to baseband. In general the RX-RF block includes a low noise amplifier (LNA) to amplify signals received by the antenna, downconversion circuitry to downconvert the received signal to baseband, and an amplifier chain to further amplify the downconverted signal. In most embodiments the RX-RF block will also include automatic gain control circuitry, and possibly other circuitry.

The baseband signal is received by an analog-to-digital converter (ADC) 107 and converted to a digital signal. The digital signal is received by a Fast Fourier Transform (FFT) block 109 and converted from a time domain signal to a frequency domain signal.

The frequency domain signal is thereafter processed by an RX processing chain 111. In general the RX processing chain includes circuitry for performing demapping or demodulation, deinterleaving, and channel decoding, using a Viterbi decoder for example, of the signal. In addition, although not explicitly shown, the system will also generally include packet detection circuitry and frame detection circuitry between the ADC and the FFT block, as well as other circuitry commonly employed in ultrawideband transceivers.

The system of FIG. 1 additionally includes a detect block 113. The detect block includes circuitry for detecting transmissions by narrowband transmitters about selected frequencies. In most embodiments the detect block includes circuitry for comparing the received signal, in the form of the digital baseband signal provided by the ADC, with an expected signal of a narrowband transmitter. The expected signal may be, for example, a preamble sequence or some other characteristic pattern commonly transmitted by a narrowband transmitter. In some embodiments the detect block includes memory for storing representations of expected signals of a narrowband transmitter and cross-correlation circuitry for cross-correlating the received signal with the representation of expected signals of a narrowband transmitter. In further embodiments the detect block may also include auto-correlation circuitry for performing auto-correlation of the received signal. Auto-correlation of the received signal may be useful, particularly if a narrowband transmitter transmits similar signals, such as preamble sequences, repetitively over time. In some embodiments the detect block includes circuitry for filtering the received signal about a selected frequency, with the selected frequency changing over time. The detect block provides a signal to the transmit chain indicating frequencies at which transmissions are to be minimized.

The transmit chain includes a transmit processing chain 117. Generally the transmit processing chain includes circuitry for channel coding, interleaving, mapping or modulating. The mapped or modulated symbols are provided, as illustrated, to a tone nulling block 119. Some embodiments may not include a tone nulling block, instead for example only including a notch filter later described. The tone nulling block nulls frequency components in accordance with the signal from the detect block which indicates frequencies to avoid. The tone nulled symbols are provided to an inverse Fast Fourier Transform (iFFT) block 121. The iFFT block transforms the symbols to the time domain. A notch filter 123 receives the time domain version of the symbols. The notch filter filters the time domain signal about frequencies indicated as frequencies to avoid by the detect block. As with the tone nulling block, in some embodiments a tone nulling block may only be used, with the notch filter not implemented. After filtering the signals provided to a digital to analog converter (DAC) 125. The DAC converts the signal to an analog signal. The analog signal is received by a transmit RF block 127. The transmitter RF block generally includes up-conversion circuitry for up converting the signal from base band to radio frequency, and amplification circuitry for amplifying the signal prior to transmission over an antenna (not shown).

In some embodiments the system of FIG. 1 is implemented as a physical layer device (PHY), generally as a discrete chip. In some embodiments, however, some or all of the circuitry for the detect block may be implemented on a media access controller (MAC), which may also be implemented as a discrete chip. In most embodiments, however, portions of the detect block, such as auto-correlation and cross-correlation circuitry, are implemented on the PHY, with memory holding representations of expected narrow band transmission signals and circuitry for determining the selection of frequencies for comparison purposes implemented in the MAC, either by way of software, which may be implemented in firmware, or in circuitry.

It should also be recognized that in some embodiments the indication of frequencies for which usage should be avoided may be provided to a transmit chain at a location different than the receiver. For example, in some embodiments a first ultrawideband transceiver at a first location may detect the presence of a narrowband transmitter, and provide a signal to a second ultrawideband transceiver at a second location, with the second ultrawideband transceiver instead or also performing tone nulling and/or notching.

Figure 2:
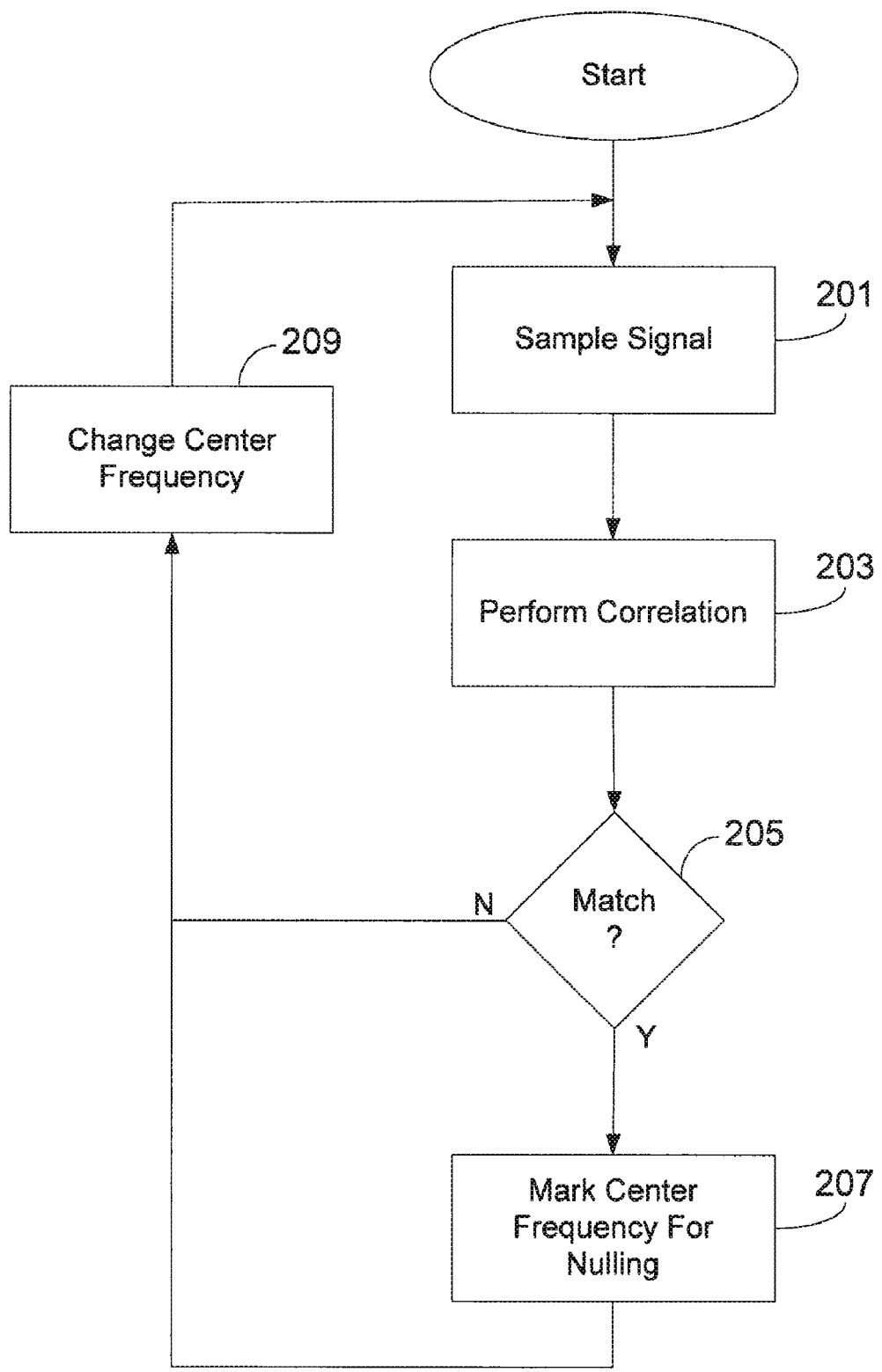
FIG. 2 is a flow diagram of a process for determining frequencies to avoid in accordance with aspects of the invention.

FIG. 2 is a process for determining frequencies to avoid in accordance with aspects of the invention. In many embodiments the process of FIG. 2 is performed by circuitry of a PHY device, or by a combination of a PHY device and a MAC device. In some embodiments the process is performed throughout times of operation of the devices, although in some embodiments the process is performed periodically.

In block 201 the process samples received signals. In many embodiments the sampled signal is a time domain digital baseband representation of a received signal. In many embodiments the sampling may be performed by circuitry configured as a finite impulse response (FIR) filter. Preferably, the sampled signals are also shifted such that low pass filtering by the FIR filter effectively samples the signal about a selected frequency.

In block 203 the process correlates the sampled signal. In some embodiments the correlation is an auto-correlation, with the repetition in a received signal indicating a transmitter. In some embodiments the received signal is cross-correlated with an expected signal from a narrowband transmitter, the correlation indicating the presence of a narrowband transmitter. In most embodiments, however, both auto-correlation and cross-correlations are performed.

In block 205 the process determines if the correlations indicate a match between the received signal and an expected signal of a narrowband transmitter. If the process determines that the signals match, the process in block 207 marks a center frequency for nulling and proceeds to block 209. If the process determines that no match is found the process also proceeds to block 209. In block 209 the process changes a center frequency for sampling, and returns to block 201.

Figure 3:
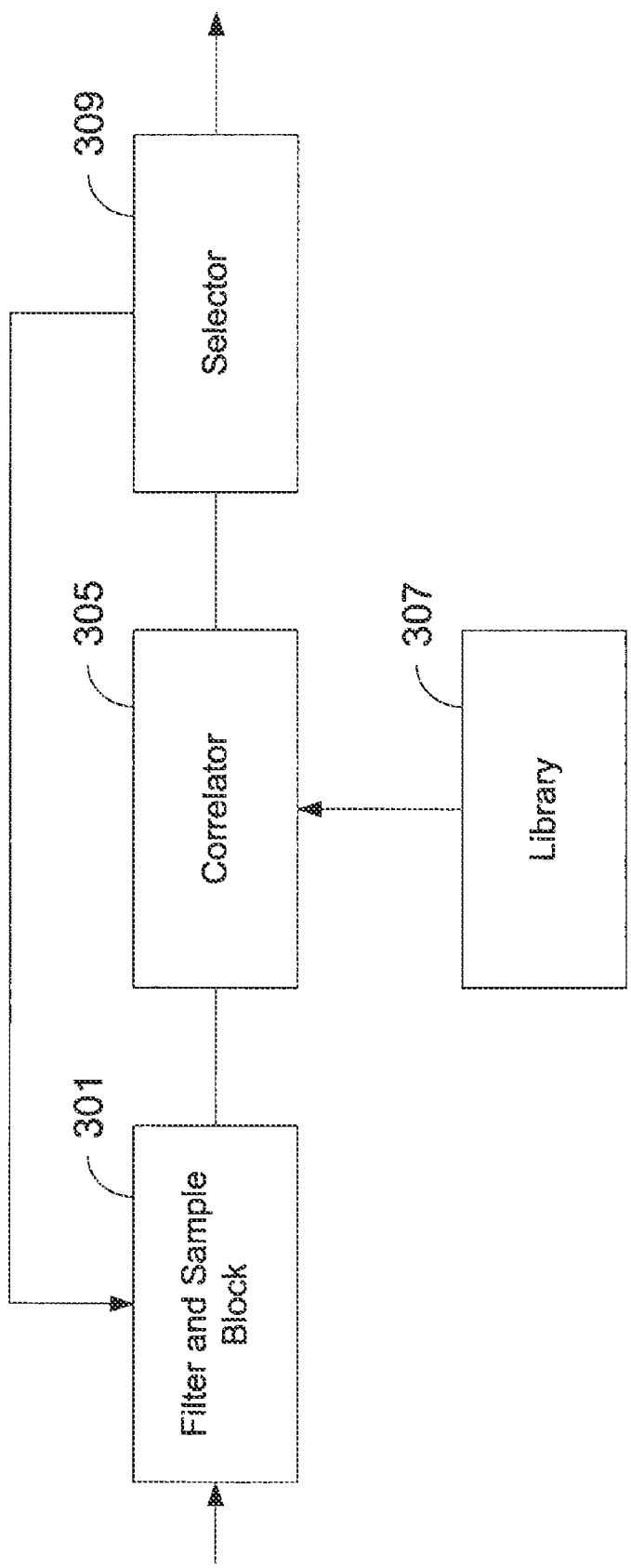
FIG. 3 is a block diagram of a detect block in accordance with aspects of the invention.

FIG. 3 is a block diagram of a detect block in accordance with aspects of the invention. The detect block includes a filter and sample block 301. The filter and sample block receives a digital baseband signal, generally from an output of an analog-to-digital converter of a receiver chain. The filter and sample block filters the received signal about a selected frequency and samples the filtered signal. In some embodiments the filter and sample block includes a phase shifter for shifting a signal by a selected frequency, a low pass filter for filtering the signal, and a sample block to downsample the signal. In many embodiments the filter and sample block may be implemented as a FIR filter or a series of FIR filters.

The filtered and sampled signal is received by a correlator block 305. The correlator block includes circuitry for comparing the filtered and sampled signal with signal patterns of expected signals from narrowband transmitters. In some embodiments the correlator block includes cross-correlation circuitry for performing the comparison. In some embodiments the correlator block includes both auto-correlation circuitry and cross-correlation circuitry, with for example an auto-correlation being performed to locate repetitive signals, and cross-correlation performed to determine if the repetitive signals match the expected narrowband transmitter signal patterns.

The signal patterns are stored in a library 307, with the library generally implemented as a memory storing the signal patterns. For example, the memory may include a filtered and sampled version of a preamble sequence for a narrowband transmitter.

The correlator block provides to a selector block 309 an indication of whether the correlator block has determined there to be a match between the filtered and sampled signal and the representation of an expected signal from the library. The selector block selects a frequency for phase shifting by the filter and sample block, and therefore of the frequency for which comparisons are performed. In addition, the selector block provides an indication of a selected frequency for which matches have been found.

Figure 4:
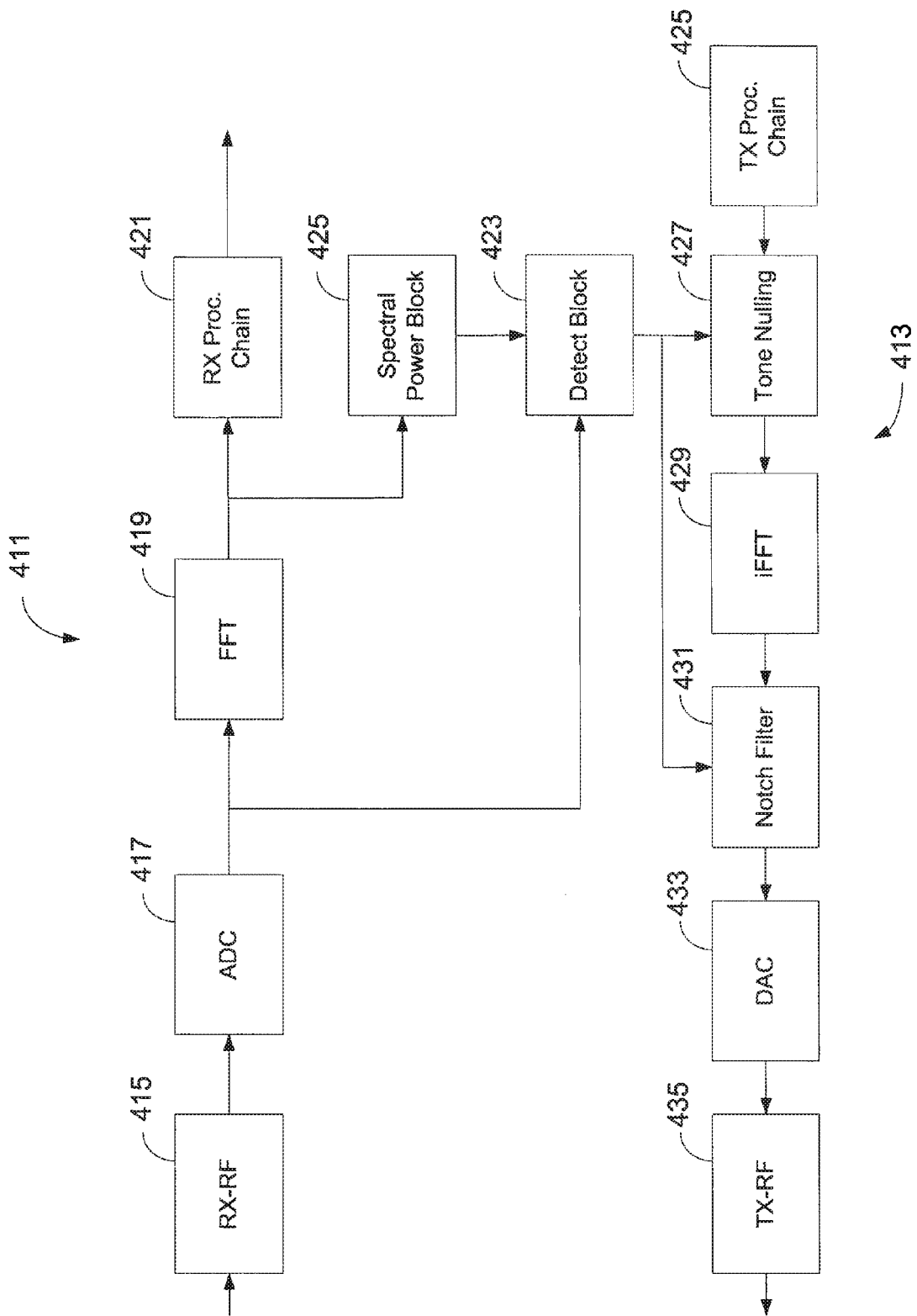
FIG. 4 is a block diagram of a further transceiver in accordance with aspects of the invention.

FIG. 4 is a block diagram of a further transceiver in accordance with aspects of the invention. The transceiver of FIG. 4 includes a receiver chain 411 and a transmit chain 413. As with the transceiver of FIG. 1, the receiver chain includes a receive RF block 415. The receive RF block downconverts a signal received by an antenna to baseband and amplifies the analog baseband signal. The analog signal is provided to an ADC 417 which digitizes the signal. The digitized signal is transformed from the time domain to the frequency domain by an FFT block 419, with the frequency domain signal further processed by further circuitry in a receiver processing chain 421.

As with the transceiver of FIG. 1, a digitized time domain representation of the received signal is provided to a detect block 423. In addition, a spectral power block 425 also receives the frequency domain signal provided by the FFT block. The spectral power block identifies frequencies at which signals are being received, for example signals above a predefined noise level. The spectral power block provides an identification of these frequencies, which may be considered frequencies of interest, to the detect block. Accordingly, the detect block of FIG. 4 may restrict sampling of frequencies to the frequencies of interest as indicated by the spectral power block.

In some embodiments the spectral power block may be implemented in a PHY device or a MAC device, or with circuitry in a combination of both the PHY device and the MAC device.

As with the transceiver of FIG. 1, the detect block provides an indication of frequencies for which no transmitter power is desirable to the transmitter chain. The transmitter chain, as with the transmitter chain of FIG. 1, includes transmit processing circuitry 425, which provides frequency domain symbols to a tone nulling block 427. The tone nulling block nulls components at frequencies as identified by the detect block. The frequency domain signal with nulled components is received by an iFFT block 429, which converts the frequency domain signal to the time domain. The time domain signal is filtered by a notch filter 431 about the frequencies at which no transmissions are desired, again as informed by the detect block. The filtered signal is converted to an analog signal by a DAC 433. The analog signal is upconverted and amplified for transmission through an antenna by a transmitter RF block 435.

Figure 5:
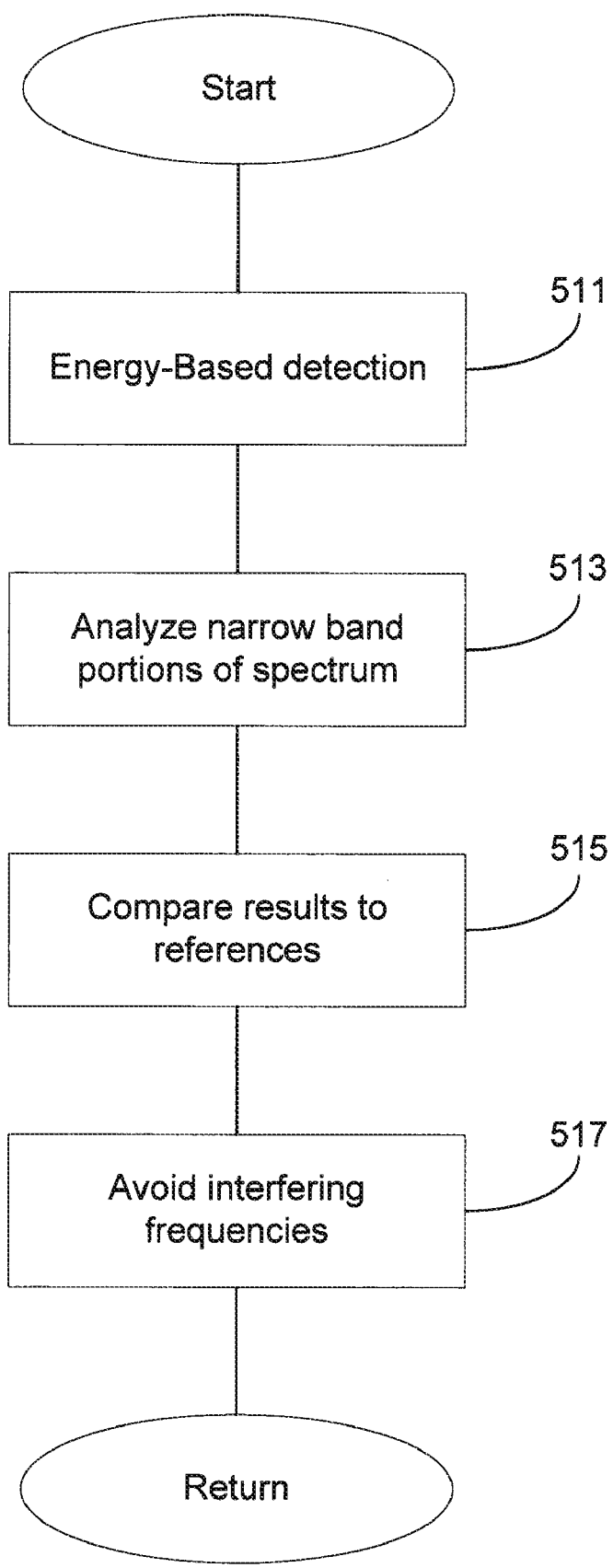
FIG. 5 is a flow diagram of a process for detecting and avoiding interference with narrowband transmitters in accordance with aspects of the invention.

FIG. 5 is a flow diagram of a process for detecting and avoiding narrowband transmitters in accordance with aspects of the invention. In some embodiments the process of FIG. 5 is performed by a transceiver such as described with respect to FIG. 4.

In block 511 the process performs energy based detection. For example, in some embodiments the process determines whether strength, for example as indicated by energy level, of signals received at various frequencies exceed a predefined level. In some embodiments the determination is based on analysis of output of an FFT block.

In block 513 the process analyzes narrowband portions of spectrum about frequencies determined to include received signals with energy levels above the predefined level. In block 515 the process compares the analyzed signals with a library of reference patterns, with the patterns indicative of signals expected to be transmitted by narrowband transmitters. Thus, in most embodiments the comparison is made with a reference signal which would resemble the narrowband transmitter signal after the narrowband transmitter signal is subject to manipulation as performed on received signals during analysis of narrowband portions of the spectrum. The comparison of the results of the analysis of narrowband portions of the spectrum with respect to the reference signals indicates frequencies for which transmission is not desired. Generally the comparison indicates a degree of matching between the received signal and an expected narrowband transmitter signal, with a degree of matching above a predefined level indicating a match.

In block 517 the process avoids transmissions at interfering frequencies. In most embodiments the process does so by attempting to minimize components of signals at frequencies identified as interfering. For example in some embodiments frequency components may be nulled in the frequency domain or a time domain signal may be filtered, or both frequency nulling and filtering may be performed.

Figure 6:
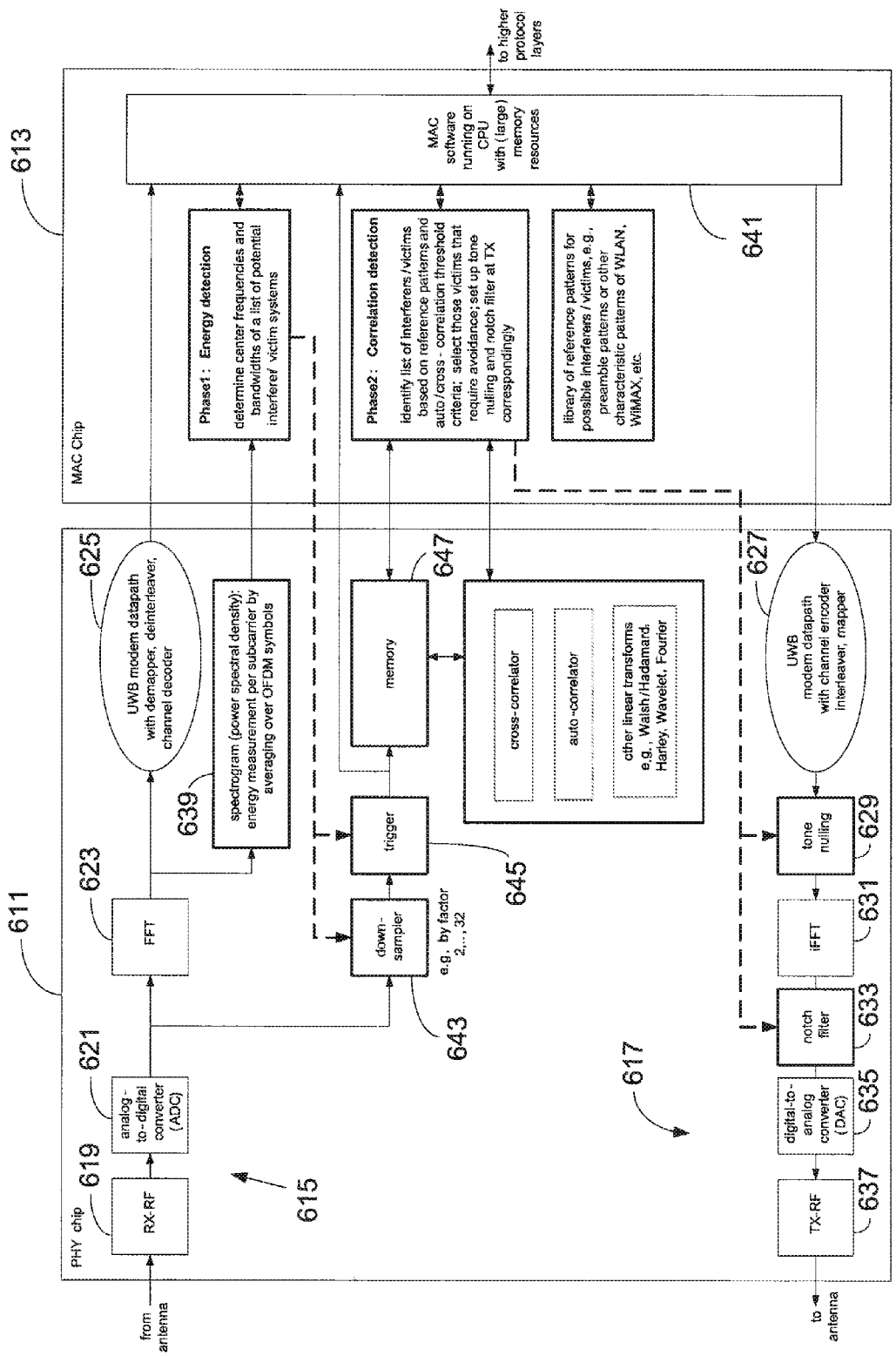
FIG. 6 is a block diagram of a chipset for a transceiver including detect and avoid circuitry in accordance with aspects of the invention.

FIG. 6 is a block diagram of a further transceiver, an ultrawideband transceiver utilizing OFDM symbols in a frequency hopping manner, in accordance with aspects of the invention. The transceiver of FIG. 6 includes both a PHY chip 611 and a MAC chip 613. The PHY chip includes a receiver chain 615 and a transmitter chain 617. The receiver chain includes a receiver RF block 619, an ADC 621, an FFT block 623, and circuitry 625 commonly found in an ultrawideband receiver chain, for example a demapper, a deinterleaver, a channel decoder. The receiver chain provides decoded symbols, for example as a bit stream, to the MAC chip, which performs higher level functions.

Similarly, the transmit chain includes circuitry 627 commonly found in ultrawideband transmitters, such as a channel encoder, an interleaver, and a mapper. As discussed with respect to FIGS. 1 and 4, the transmit chain includes a tone nulling block 629, an iFFT block 631, a notch filter 633, a DAC 635, and a transmitter RF block 637.

The PHY additionally includes circuitry configured for performing narrowband transmission detection functions, with the circuitry coupled to the receive chain. The circuitry includes circuitry 639 to determine energy levels of received symbols on a per subcarrier basis. The circuitry receives the output of the FFT block, which provides a frequency domain representation of the signal. Preferably the circuitry averages energy levels on a sub-carrier basis over a number of OFDM symbols. Averaging energy levels over a number of symbols, for example over 64 ultrawideband OFDM symbols, may reduce the influence of thermal noise or other noise sources not related to narrowband transmitters in a narrowband communication system. The circuitry provides an indication of energy per subcarrier, and therefore energy at different frequencies, to the MAC chip. The MAC chip includes a processor 641 executing software instructions. The software instructions may be part of a system driver or implemented as embedded firmware. The software receives the indication of energy levels at different frequencies, for example using mean values of energy levels, and determines center frequencies and bandwidths of potential narrowband transmitters based on the energy levels. The MAC chip provides an indication of the center frequencies, and bandwidth in many embodiments, to the PHY chip.

The PHY chip further includes a downsampler 643 which receives the indication of the center frequencies, and preferably bandwidths associated with those frequencies. The downsampler also receives a time domain signal from the analog-to-digital converter. The downsampler includes circuitry for filtering and downsampling the time domain signal. In many embodiments the filter and down sampler circuitry is configured as an FIR filter, with a phase shifter to phase shift the signal such that a low pass aspect of the FIR filter removes signal components other than those components about the center frequency of interest.

As illustrated in FIG. 6, the downsampled output of the downsampler is passed through a trigger 645. In some embodiments the trigger is used to trigger capture of data, for example to restrict capture of data to data that is of interest. Captured data is stored in an on-chip memory 647 on the PHY.

In some embodiments the captured data is provided to the MAC chip, with software in the MAC chip performing a comparison of the captured data with reference patterns stored on the MAC chip. The reference patterns may be derived, for example, from expected transmissions of narrowband transmitters, for example based on expected preamble sequences of a WLAN or WiMAX system. In some embodiments the reference patterns may result from subjecting the expected preamble sequences, or downsampled and/or filtered versions of the preamble sequences, to a linear transform or other processing, and the reference pattern therefore may be considered as a fingerprint of a narrowband transmitter.

As illustrated in FIG. 6, the PHY includes an on-chip co-processor for performing cross-correlation and auto-correlation. In some embodiments the co-processor also includes processing circuitry for performing a linear transform, such as a Walsh/Hadamard transform, a Harley transform, a Wavelet or a Fourier transform. In such embodiments the captured downsampled data is processed by the on-chip co-processor, with the on-chip co-processor receiving reference patterns from the MAC. In such embodiments the indication of detection of narrowband transmitters is provided to the MAC. The MAC in turn provides a signal to the transmit chain of the PHY indicating frequencies for tone nulling and notching.

Figure 7A:
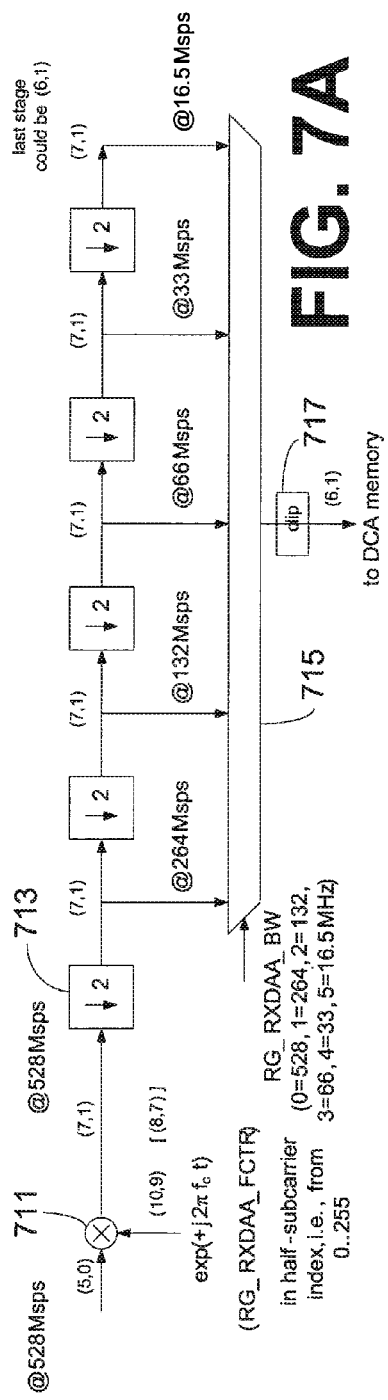
FIGS. 7A-C are block diagrams of a filter and downsampler in accordance with aspects of the invention.
Figure 7B:
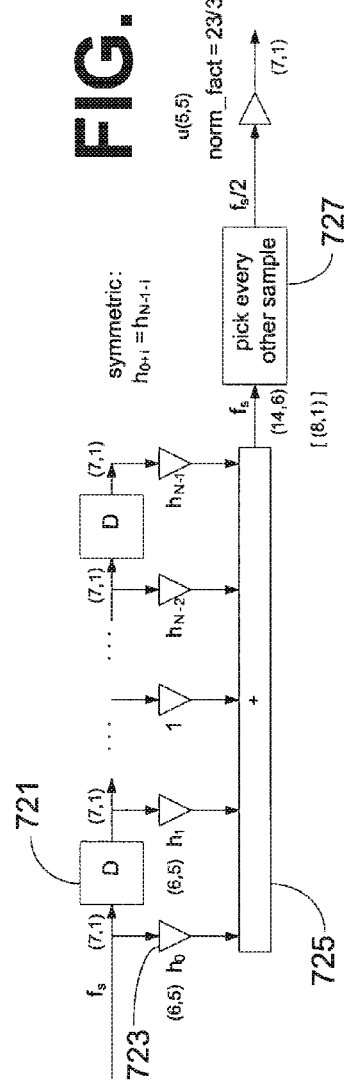
Figure 7C:
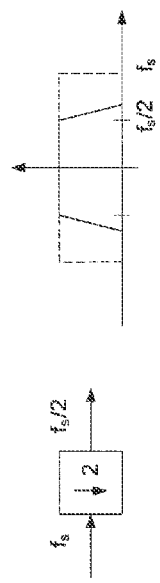

FIG. 7A-C are block diagrams illustrating features of a downsampler in accordance with aspects of the invention. In most embodiments downsampling is performed separately for both the I and Q chains of both real and imaginary parts of received signals. FIG. 7A shows a downsampler. An input signal is provided to a multiplier 711. The multiplier multiplies the signal by a frequency shifting signal, which is generally complex such that the multiplier is a complex multiplier. Generally the phase shifting signal is set so as to shift a center frequency of interest.

The phase shifted signal is provided to a cascade of 2 to 1 downsampler blocks 713. In many embodiments the downsampler blocks are sinc low pass FIR filters with a 2 to 1 decimation at the output. As each downsampler block performs 2 to 1 decimation, each following stage in the cascade of downsampler blocks may be clocked at half the rate. The output of each of the downsampler blocks is provided to a multiplexer 715. The multiplexer block uses as a selector a signal indicating bandwidth desired for sampling purposes.

FIG. 7B is a block diagram of an implementation of a FIR filter. As illustrated, the FIR filter uses a cascade of delay blocks 721, with an input signal provided to the cascade of delay blocks. The input signal and outputs of each of the delay blocks is subject to a multiplier 723, with the weightings of the multipliers preferably symmetric such that the FIR filter is symmetric. The outputs are summed by a summer 725 and decimation is performed by picking every other sample by a decimation block 727.

FIG. 7C shows a downsampler block and associated filtering effect, a low pass filtering effect, through the use of a FIR filter. Accordingly, with phase shifting the center frequency of interest towards a zero frequency, the low pass filter effectively provides samples about the center frequency of interest.

Figure 8:
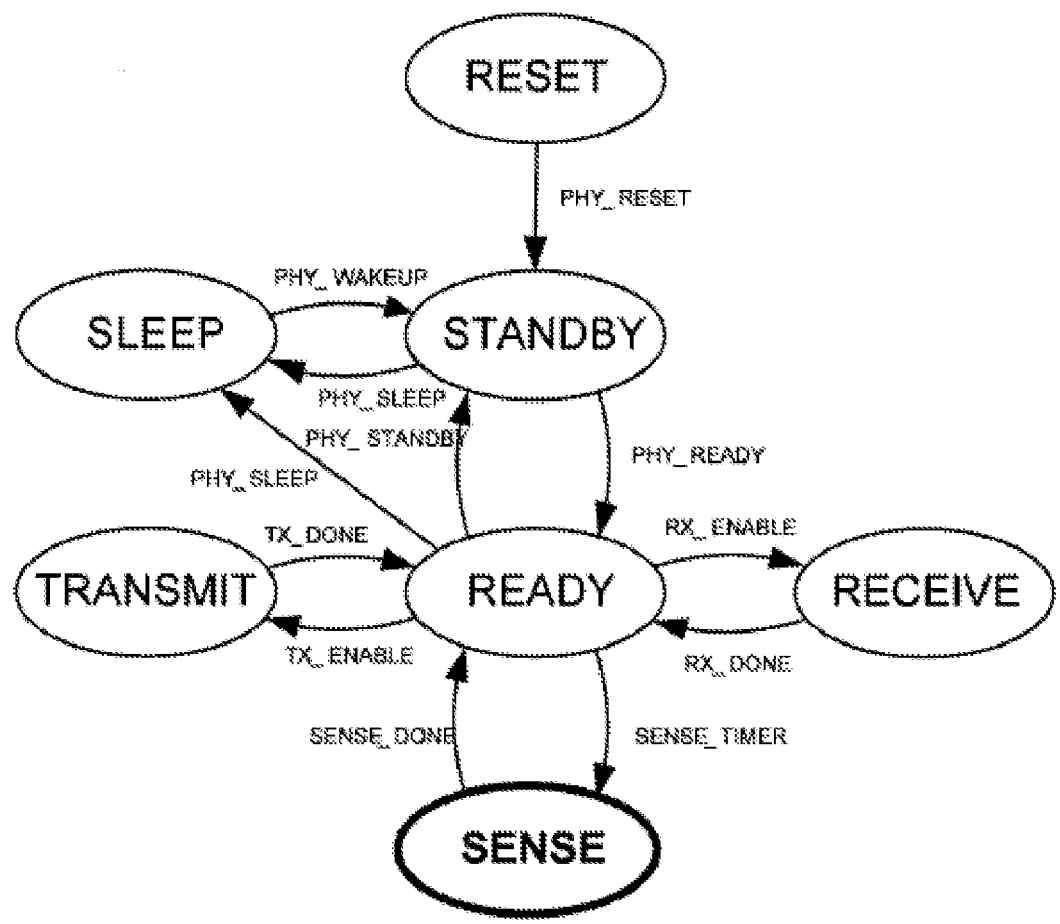
FIG. 8 is a state diagram for a system in accordance with aspects of the invention.

FIG. 8 is a state diagram used in some embodiments of the invention. In some embodiments capture of data for use in determining the presence of a narrowband transmitter is performed at times as commanded by a MAC. For example, the sensing function may be performed on a periodic basis, or during a MAC coordinated silence period amongst a piconet, with the piconet being a network of ultrawideband systems in data communication with one another.

In the state diagram of FIG. 8, a reset causes a PHY to enter into a standby mode. From the standby mode the PHY may be placed into a sleep mode, and upon a command for the PHY to wakeup the PHY exits the sleep mode and return to the standby mode. When a PHY is ready the PHY enters a ready mode. From the ready mode the PHY may go to the sleep mode, or cycle to and from either a transmit mode or a receive mode. The PHY goes to a sense mode either upon a signal received by the MAC indicating a piconet wide coordinated silence period, or alternatively, on the periodic basis when the device is neither in a transmit nor in a receive mode. In the sense mode the PHY attempts to detect narrowband transmitters in a narrowband communication system. Upon completion of a sense functions PHY returns to the ready mode.

Accordingly, the invention provides systems and method for detection and avoidance of narrowband transmitters transmitting data. Although the invention has been discussed with respect to certain embodiments, it should be recognized that the invention comprises the claims and their insubstantial variations supported by this disclosure.

What is claimed is:

1. A method, implemented in a communications transceiver, of detecting communications by narrowband communications systems for avoidance of interference with the narrowband communication systems, comprising: receiving a signal in a receive path of the communications transceiver; correlating the received signal with a plurality of different signal patterns stored in a library; determining, based on the correlating, whether the received signal corresponding to a selected frequency has characteristics of a signal expected to be communicated by a narrowband transmission system; marking a center frequency for nulling transmissions corresponding to the selected frequency in response to the determining operation; and adjusting a center frequency for transmissions, via a transmit path of the communications transceiver, in response to the determining operation, such that the center frequency for transmission avoids the marked center frequency, wherein the correlating further comprises performing an autocorrelation of the received signal corresponding to the selected frequency and performing a cross-correlation of the received signal with the signal expected to be communicated by the narrowband transmission system.

2. The method of claim 1, further comprising sampling and filtering the received signal corresponding to the selected frequency.

3. The method of claim 1, further comprising changing the selected frequency over time.

4. The method of claim 3, further comprising determining frequencies at which signals are received, and changing the selected frequency to the frequencies at which signals are received over time.

5. The method of claim 1 further comprising maintaining in the library a plurality of signal patterns, the signal patterns corresponding to expected processed signals of narrowband transmitters in a narrowband transmission system.

6. The method of claim 5 wherein determining whether a received signal corresponding to the selected frequency matches the signal expected to be communicated by the narrowband transmission system comprises:

processing the received signal; and comparing the processed received signal to the plurality of signal patterns.

7. A transceiver for a communication system, comprising: downconversion circuitry for downcoverting a received signal to baseband; an analog to digital converter for converting the baseband signal to a digital signal; a Fast Fourier Transform block for transforming the digital signal to a frequency domain signal; receiver processing circuitry for processing the frequency domain signal to provide a data stream; a filter for filtering the digital signal outside a band of frequencies to provide a band filtered signal; a correlator for correlating the band filtered signal to a plurality of signal patterns stored in a library, wherein each signal pattern is characteristic of a signal in a narrowband communication system, the correlator configured to perform the correlating by cross-correlating the band filtered signal with a signal expected to be communicated by the narrowband transmission system and performing an autocorrelation of the band filtered signal corresponding to a selected frequency; an inverse Fast Fourier Transform block for transforming a signal for transmission to a time domain signal; a digital to analog converter for converting the time domain signal to an analog signal; upconversion circuitry for upconverting the analog signal to radio frequency; and circuitry for nulling transmissions corresponding to frequencies identified as in use by the narrowband communication system.

8. The transceiver of claim 7 further comprising a downsampler for reducing a number of bits of the band filtered signal.

9. The transceiver of claim 8 further comprising a phase shifter for shifting the digital signal in frequency by a center frequency of the band of frequencies, and wherein the filter is a symmetric Finite Impulse Response (FIR) filter.

10. The transceiver of claim 9 further comprising energy evaluation circuitry for determining energy levels at different frequencies of the frequency domain signal.

11. The transceiver of claim 10 further comprising a processor configured to select the center frequency for the band of frequencies based on outputs of the energy evaluation circuitry.

12. The transceiver of claim 7 wherein the pattern characteristic of a signal in a narrowband communication system is a pattern characteristic of a preamble sequence in a narrowband communication system.

13. The transceiver of claim 7, wherein the pattern characteristic of a signal in a narrowband communication system comprises patterns formed by processing of expected received signals of a narrowband communication system.

* * * * *